US009557675B2

(12) United States Patent
Tyagi et al.

(10) Patent No.: US 9,557,675 B2
(45) **Date of Patent: *Jan. 31, 2017**

(54) RECEIVER MATERIALS WITH COLOR TONER IMAGES AND FLUORESCENT HIGHLIGHTS

(71) Applicant: Eastman Kodak Company, Rochester, NY (US)

(72) Inventors: Dinesh Tyagi, Mead, CO (US); Louise Granica, Victor, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,851

(22) Filed: Jan. 5, 2016

(65) Prior Publication Data

US 2016/0131988 A1 May 12, 2016

Related U.S. Application Data

(63) Continuation of application No. 13/836,491, filed on Mar. 15, 2013, now Pat. No. 9,261,808.

(51) Int. Cl.

| | |
|---|---|
| ***B32B 7/02*** | (2006.01) |
| ***G03G 9/09*** | (2006.01) |
| ***G03G 15/01*** | (2006.01) |
| ***G03G 15/00*** | (2006.01) |
| ***G03G 7/00*** | (2006.01) |

(52) U.S. Cl.
CPC ............... *G03G 9/0926* (2013.01); *B32B 7/02* (2013.01); *G03G 7/008* (2013.01); *G03G 9/0906* (2013.01); *G03G 15/0126* (2013.01); *G03G 15/0194* (2013.01); *G03G 15/6585* (2013.01); *G03G 2215/0141* (2013.01)

(58) Field of Classification Search
None
See application file for complete search history.

(56) References Cited

U.S. PATENT DOCUMENTS

| | | | |
|---|---|---|---|
| 3,713,861 | A | 1/1973 | Sharp |
| 5,105,451 | A | 4/1992 | Lubinsky et al. |
| 5,910,388 | A | 6/1999 | Ray et al. |

(Continued)

FOREIGN PATENT DOCUMENTS

| | | |
|---|---|---|
| JP | 10-107970 | 4/1998 |
| JP | 2002-082582 | 3/2002 |
| JP | 2004-348539 | 12/2004 |

*Primary Examiner* — Joshua D Zimmerman
(74) *Attorney, Agent, or Firm* — J. Lanny Tucker

(57) ABSTRACT

Fluorescing highlights can be provided in selected portions of non-color image areas of a printed toner image using fused fluorescing dry toner particles, such as fused fluorescing magenta or fused fluorescing yellow dry toner particles. Before fixing, each fluorescing dry toner particle comprises a polymeric binder phase and a fluorescing colorant that emits at one or more $\lambda_{max}$ wavelengths of at least 420 nm and up to and including 690 nm and that is dispersed within the polymeric binder phase. The resulting printed color images and fluorescent highlights can be provided on receiver materials of various types to accentuate or emphasize the printed color images with a variety of light-colored fluorescent shading.

12 Claims, 1 Drawing Sheet

(56) References Cited

U.S. PATENT DOCUMENTS

| | | | |
|---|---|---|---|
| 6,664,017 | B1 | 12/2003 | Patel et al. |
| 8,936,897 | B2 | 1/2015 | Tyagi et al. |
| 9,057,978 | B2 | 6/2015 | Tyagi et al. |
| 9,261,808 | B2 * | 2/2016 | Tyagi ................. G03G 15/0126 |
| 2005/0058466 | A1 | 3/2005 | Toyohara |
| 2010/0164218 | A1 | 7/2010 | Schulze-Hagenest et al. |
| 2013/0295341 | A1 | 11/2013 | Tyagi et al. |

* cited by examiner

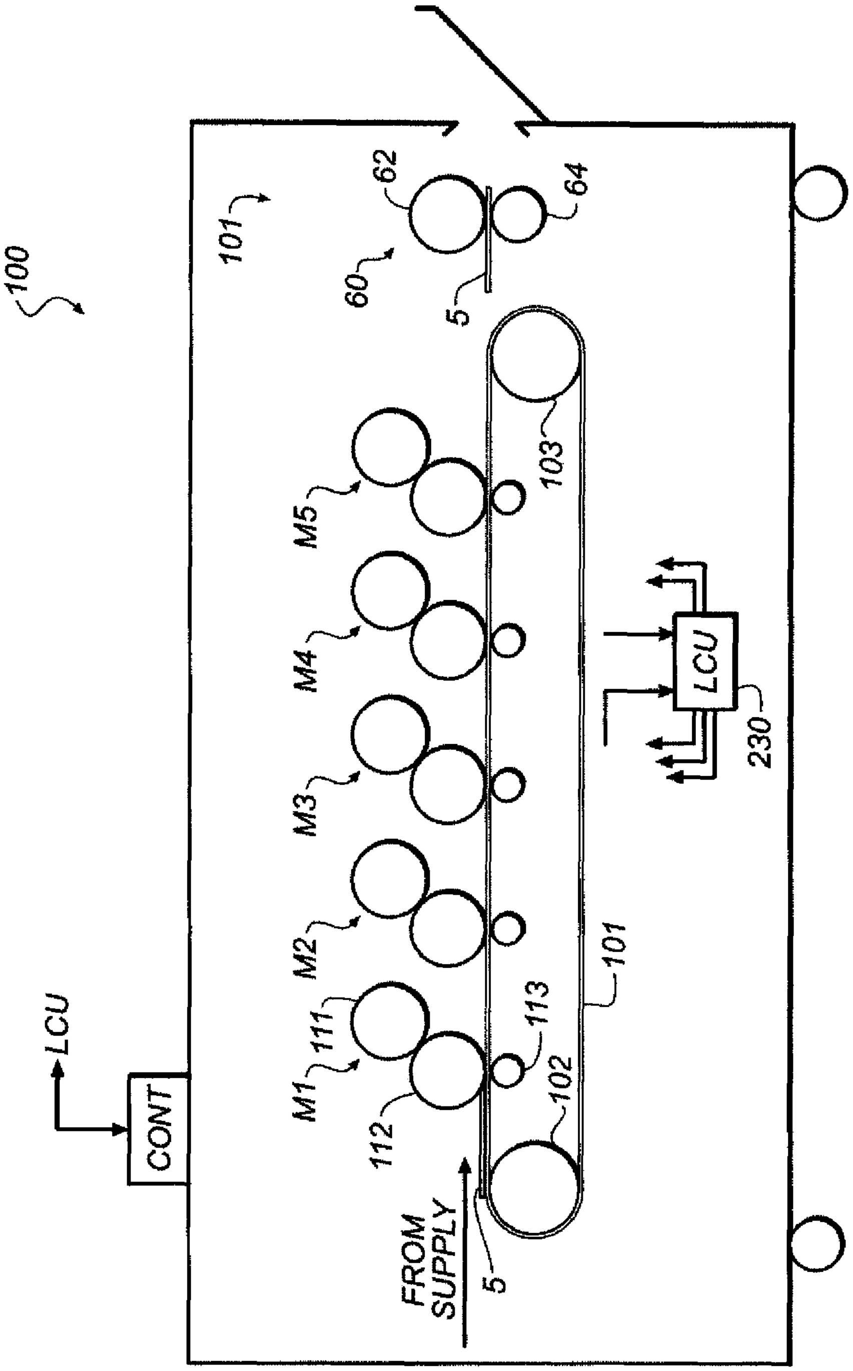
100
101
60
62
64
5
103
M5
M4
M3
M2
M1
111
112
113
102
101
LCU
230
CONT
LCU
FROM SUPPLY
5

RECEIVER MATERIALS WITH COLOR TONER IMAGES AND FLUORESCENT HIGHLIGHTS

RELATED APPLICATION

This application is a Continuation of and commonly assigned U.S. Ser. No. 13/836,491, filed Mar. 15, 2013 by Tyagi and Granica (now allowed), which is a Continuation-in-part of and commonly assigned U.S. Ser. No. 13/462,155, filed May 2, 2012 by Tyagi and Granica (now abandoned).

FIELD OF THE INVENTION

This invention relates to a method for highlighting color toner images using fluorescing dry toner particles that are applied in non-color areas outside the color toner images.

BACKGROUND OF THE INVENTION

One common method for printing images on a receiver material is referred to as electrophotography. The production of black-and-white or color images using electrophotography generally includes the producing a latent electrostatic image by uniformly charging a dielectric member such as a photoconductive substance, and then discharging selected areas of the uniform charge to yield an imagewise electrostatic charge pattern. Such discharge is generally accomplished by exposing the uniformly charged dielectric member to actinic radiation provided by selectively activating particular light sources in an LED array or a laser device directed at the dielectric member. After the imagewise charge pattern is formed, it is "developed" into a visible image using pigmented or non-pigmented marking particles (generally referred to as "toner particles") by either using the charge area development (CAD) or the discharge area development (DAD) method that have an opposite charge to the dielectric member and are brought into the vicinity of the dielectric member so as to be attracted to the imagewise charge pattern.

Thereafter, a suitable receiver material (for example, a cut sheet of plain bond paper) is brought into juxtaposition with the toner image developed with the toner particles in accordance with the imagewise charge pattern on the dielectric member, either directly or using an intermediate transfer member. A suitable electric field is applied to transfer the toner particles to the receiver material in the imagewise pattern to form the desired print image on the receiver material. The receiver material is then removed from its operative association with the dielectric member and subjected to suitable heat or pressure or both heat and pressure to permanently fix (also known as fusing) the toner image (containing toner particles) to form the desired image on the receiver material.

Plural toner particle images of, for example, different color toner particles respectively, can be overlaid with multiple toner transfers to the receiver material, followed by fixing of all toner particles to form a multi-color image in the receiver material. Toners that are used in this fashion to prepare multi-color images are generally Cyan (C), Magenta (M), Yellow (Y), and Black (K) toners containing appropriate dyes or pigments to provide the desired colors or tones.

It is also known to use special spot toners to provide additional colors that cannot be obtained by simply mixing the four "primary" toners. An example is a specially designed toner that provides a color spot or pearlescent effect.

With the improved print image quality that is achieved with the more recent electrophotographic technology, print providers and customers alike have been looking for ways to expand the use of images prepared using electrophotography. Printing processes serve not only to reproduce and transmit objective information but also to convey esthetic impressions, for example, for glossy books or pictorial advertizing.

The desire to provide fluorescing effects has existed for several decades and U.S. Pat. No. 3,713,861 (Sharp et al.) describes coating a fluorescent material entirely over a document image.

Many color images cannot be reproduced using the traditional CYMK color toners. Specifically, fluorescing colors or tones cannot be readily reproduced using the CYMK color toner set. It has been proposed to incorporate fluorescing pigments or dyes into liquid toner particles as described in U.S. Pat. No. 5,105,451 (Lubinsky et al.) to be used within the color images.

U.S. Patent Application Publication 2010/0164218 (Schulze-Hagenest et al.) describes the use of substantially clear (colorless) fluorescent toner particles in printing methods over color toner images. Such clear fluorescent toner particles can be used for security purposes since they are not colored except when excited with appropriate light. Other invisible fluorescent pigments for toner images are described in U.S. Pat. No. 6,664,017 (Patel et al.).

Printing processes for providing one or more color toner images are known, but the typical CYMK color toner images are not useful for provided highlights in non-color images like highlighter pens would provide. There is a need to find a way to provide desirable "highlights" around conventional color toner images on a given receiver material, which highlights would not be over the color toner images but located in selected portions of non-color or non-image areas on the receiver material. Such highlights would bring more attention to the color image details.

SUMMARY OF THE INVENTION

The present invention provides a method for providing a highlighted color toner image, the method comprising:

developing one or more color latent images using corresponding color toner particles to form a composite color toner image on a first receiver material, prior to or subsequently to developing the composite color toner image on the first receiver material, developing one or more selected portions of non-color image areas on the first receiver material with fluorescing dry toner particles to provide a developed fluorescing toner highlight in the one or more selected portions of the non-color image areas, transferring the composite color toner image and the one or more developed fluorescing toner highlight in the one or more non-color image areas, to a final receiver material to form a composite color toner image and a fluorescing toner highlight in the one or more selected portions of the non-color image areas, and fixing the composite color toner image and the fluorescing toner highlight on the final receiver material, wherein, before fixing, each fluorescing dry toner particle comprises a polymeric binder phase and a fluorescing colorant that emits at one or more peak wavelengths of at least 420 nm and up to and including 690 nm and that is dispersed within the polymeric binder phase.

While a single fluorescing color can be used in a particular image as the only highlighting color or hue, it is also possible to use more than one highlighting color or hue in the same or different non-color image areas on a receiver material.

In some embodiments, the method of this invention comprises:

prior to or subsequently to developing the composite color toner image, applying fluorescing magenta dry toner particles in one or more selected portions of non-color image areas to provide a fluorescing magenta toner highlight in the one or more selected portions of non-color image areas, prior to or subsequently to applying the fluorescing magenta dry toner particles, applying fluorescing yellow dry toner particles in one or more different selected portions of non-color image areas to provide a fluorescing yellow toner highlight in the one or more different selected portions of the non-color image areas, transferring the composite color toner image and fluorescing magenta toner highlight and fluorescing yellow toner highlight to a receiver material, and fixing the transferred composite color toner image and fluorescing magenta toner highlight and fluorescing yellow toner highlight to the receiver material.

In some embodiments, of this invention a method for providing a highlighted color toner image, comprises:

developing one or more color latent images using corresponding color toner particles to form a composite color toner image on the final receiver material, prior to or subsequently to developing the composite color toner image on the final receiver material, developing one or more selected portions of non-color image areas on the final receiver material with fluorescing dry toner particles to provide a developed fluorescing toner highlight in the one or more selected portions of the non-color image areas on the final receiver material, to form a composite color toner image and a fluorescing toner highlight in the one or more selected portions of the non-color image areas on the final receiver material, and fixing the composite color toner image and the fluorescing toner highlight on the final receiver material, wherein, before fixing, each fluorescing dry toner particle comprises a polymeric binder phase and a fluorescing colorant that emits at one or more peak wavelengths of at least 420 nm and up to and including 690 nm and that is dispersed within the polymeric binder phase.

This invention also provides a printed receiver material provided by the method of this invention, wherein the printed receiver material comprises one or more printed composite color toner images comprising fused color toner particles in one or more color images, and fused fluorescing dry toner particles providing one or more fluorescing highlights in the non-color image areas.

In some embodiments the printed receiver material of this invention also has the properties wherein:

the reflection density of the fluorescing dry toner particles in each of the one or more fluorescing toner highlights is less than 1, the fluorescing colorant is present in the fluorescing dry toner particles in an amount of at least 5 weight % and up to and including 24 weight %, based on the total fluorescing dry toner particle weight.

This fluorescing dry toner particles used in this invention to provide various highlights in composite color toner images can comprise an appropriate fluorescing colorant in toner particles. For example, highlights can be provided using fluorescing magenta colorants that can give the appearance of a "pink" or "light magenta" shade of color and the density. Other highlights can be provided as "light yellow," for example, using fluorescing yellow colorants. These "highlights" can appear to be like those provided by common highlighter pens, but instead they are provided as fluorescing toner images.

The highlights provided by this invention have sufficient density so that they accentuate or emphasize the composite color toner images prepared using C, Y, M, or K color toners, or a combination thereof. One should carefully choose the density of the highlight so that they do not distract from, obscure, or overwhelm the composite color toner images. Using the teaching provided in this disclosure, a skilled worker in the art could readily design the desired highlight for a given composite color image.

It is particularly useful to provide fluorescing magenta or fluorescing yellow effects as highlights in one or more selected portions of non-color image areas on a printed color image such as sheets of paper or polymeric films. Composite color toner images can be monochromic or polychromic toner images comprising one or more of the typical CYMK color toner images. Thus, "black" is considered a "color" for purposes of this invention. Various amounts of the fluorescing magenta dry toner particles or fluorescing yellow dry toner particles providing fluorescing effects (various color densities) can further expand the options for an unlimited number of color highlighting effects.

The best highlighting effects are achieved when the covering power of the fluorescing dry toner particles in the fluorescing toner highlight is at least 350 $cm^2/g$ and up to and including 1100 $cm^2/g$ so that the fluorescing highlight effect does not overwhelm or distract from the C, Y, M, or K composite color toner images (such as text or pictures) on the receiver material. For example, it would be best that the fluorescing toner highlight covering power in the selected portions of the non-color image areas be about 20% and up to and including 70% of the covering power of the color toner images.

BRIEF DESCRIPTION OF THE DRAWING

FIG. 1 is schematic side elevational view, in cross section, of a typical electrophotographic reproduction apparatus (printer) suitable for use in the practice of the present invention.

DETAILED DESCRIPTION OF THE INVENTION

Definitions

As used herein to define various components of the visible fluorescing colorants, polymeric binders, non-fluorescing colorants, and other components, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

The terms "particle size," "size," and "sized" as used herein in reference to toner particles including the visible fluorescing magenta dry toner particles used in this invention, are defined in terms of the mean volume weighted diameter ($D_{vol}$) as measured by conventional diameter measuring devices such as a Coulter Multisizer (Coulter, Inc.). The mean volume weighted diameter is the sum of the mass of visible fluorescing magenta dry toner particle multiplied by the diameter of a spherical particle of equal mass and density, divided by the total visible fluorescing magenta dry toner particle mass.

"Equivalent circular diameter" (ECD) may be used herein to define the size (for example, in μm) some particles described herein, and it represents the diameter of a circle that has essentially the same area as a particle projected image. This allows irregularly shaped particles as well as spherical particles to be measured using the same parameter. Techniques for measuring ECD are known in the art.

The term "electrostatic printing process" as used herein refers to printing methods including but not limited to, electrophotography and direct, solid dry toner printing as described herein. As used in this invention, electrostatic printing means does not include the use of liquid toners to form images on receiver materials.

The term "color" as used herein refers to non-fluorescing color toner particles containing one or more non-fluorescing colorants (dyes or pigments) that provide a color or hue having an optical density of at least 0.2 at the maximum exposure so as to distinguish them from "colorless" dry toner particles that have a lower optical density. By non-fluorescing colorants, it is meant that the colorants do not emit light or "fluoresce" upon exposure to light of a different wavelength to a significant degree.

The term "fluorescing" refers to a colorant, dry toner particle, or toner image that provides a color or hue having an optical density of at least 0.2 at the maximum exposure to irradiating light, so as to distinguish them from "colorless" or "substantially clear" fluorescing colorants, toner particles, or toner images as described for example in U.S. Patent Application Publication 2010/0164218 (noted above).

The "fluorescing magenta" colorants and dry toner particles emit as one or more peak wavelengths of at least 510 nm and up to and including 590 nm, and particular at one or more peak wavelengths of at least 520 nm and up to and including 580 nm.

The "fluorescing yellow" colorants and dry toner particles emit as one or more peak wavelengths of at least 510 nm and up to and including 570 nm, and particular at one or more peak wavelengths of at least 520 nm and up to and including 560 nm.

The term "peak wavelength" in reference to the visible fluorescing colorants in the fluorescing dry toner particles means an emission peak within the noted range of wavelengths that provides the desired fluorescing highlight according to this invention. There can be multiple peak wavelengths for a given fluorescing colorant. It is not necessary that the $\lambda_{max}$ be within the noted range of wavelengths or that the peak wavelength of interest be the $\lambda_{max}$. However, many useful fluorescing colorants will have a $\lambda_{max}$ within the noted range of wavelengths and this $\lambda_{max}$ can also be the desired "peak" wavelength.

The term "composite," when used in reference to developed color toner images or developed and fixed color toner images, refers to the one to four non-fluorescing color toner images in the same mono- or multicolor toner image. "Black" is considered a "color" for purposes of this invention. Thus, a "composite color image" or "composite color toner image can refer to one or more of the CMYK colors, wherein multiple toner colors can be formed in any desired sequence.

The term "covering power" refers to the coloring strength (optical density) value of fixed dry toner particles on a specific receiver material, or the ability of the fixed dry toner particles to "cover" or hide radiation reflected from the receiver material. For example, covering power values can be determined by making patches of varying densities from non-fixed dry toner particles on a receiver material such as a clear film. The weight and area of each of these patches is measured, and the dry toner particles in each patch are fixed for example in an oven with controlled temperature that is hot enough to melt the dry toner particles sufficiently to form a continuous thin film in each patch on the receiver material. The transmission densities of the resulting patches of thin films are measured with a Status A blue filter on an X-rite densitometer (other conventional densitometers can be used). A plot of the patch transmission densities vs. initial patch dry toner weight is prepared, and the weight per unit area of toner thin film is calculated at a transmission density of 1.0. The reciprocal of this value, in units of $cm^2/g$ of fixed dry toner particles, is the "covering power". Another way of saying this is that the covering power is the area of the receiver material that is covered to a transmission density of 1.0 by 1 gram of dry toner particles. As the covering power increases, the "yield" of the dry toner particles increases, meaning that less mass of dry toner particles is needed to create the same amount of density area coverage in a printed image on the receiver material. Thus, covering power is a measurement that is taken after the dry toner particles are fixed (or fused) to a given receiver material. A skilled worker would be able from this description to measure the covering power of any particular dry toner particle composition (containing polymer binder, colorants, and optional addenda), receiver material, and fixing conditions as used in the practice of this invention.

The terms "color image area" and "non-color image area" refer to the cumulative area of a print on a receiver material. One or more color image areas are those areas on a receiver material that are covered with the one or more color toner particles. The one or more non-color image areas are those areas on the receiver material that do not contain color toner particles to any appreciable extent (less than 0.05 optical density). The fluorescing dry toner particles can be applied (and fixed) in one or more selected portions of the non-color image areas so they are not applied (and fixed) to any appreciable extent in the color image areas in the print. Thus, the highlights are generally not applied over or under the composite color images.

Dry Toner Particles

The present invention uses dry toner particles and compositions of multiple dry toner particles in dry one-component and dry two-component developers (described below) that can be used for reproduction of a fluorescing hue or effect in non-color image areas to provide one or more fluorescing highlights for the color toner image. Particularly useful fluorescing highlights are fluorescing magenta and fluorescing yellow highlights. Both color toners and fluorescing dry toner particles can be applied in this invention using an electrostatic printing process, especially using an electrophotographic imaging process.

The fluorescing dry toner particles can be porous or nonporous. For example, if they are porous particles, up to 60% of the volume can be occupied or unoccupied pores within the polymeric binder phase (matrix). The fluorescing colorants can be within the pores or within the polymeric binder phase. In many embodiments, the fluorescing dry toner particles are not purposely designed to be porous although pores may be created unintentionally during manufacture. In such "nonporous" embodiments, the porosity of the fluorescing dry toner particles used in this invention is less than 10% based on the total particle volume within the external particle surface, and the fluorescing colorants are predominantly (at least 90 weight %) in the polymeric binder phase.

The fluorescing dry toner particles used in this invention are generally non-magnetic in that magnetic materials are not purposely incorporated within the polymeric binder phase.

The fluorescing dry toner particles have an external particle surface and consist essentially of a polymeric binder phase and one or more fluorescing colorants (described below) that are generally uniformly dispersed within the polymeric binder phase to provide, when fixed (or fused) and excited by appropriate radiation, the fluorescing highlight effects described herein.

Optional additives (described below) can be incorporated into the fluorescing dry toner particles used in this invention. However, only the polymeric binder phase and the fluorescing colorants described herein are essential for providing the desired fluorescing highlights in the non-color image areas of a fixed color toner image and for this purpose, they are the only essential components of the fluorescing dry toner particles.

The polymeric binder phase is generally a continuous polymeric phase comprising one or more polymeric binders that are suitable for the various imaging methods described herein. Many useful binder polymers are known in the art as being suitable for forming dry toner particles as they will behave properly (melt and flow) during thermal fixing of the toner particles to a suitable receiver material. Such polymeric binders generally are amorphous and each has a glass transition temperature ($T_g$) of at least 50° C. and up to and including 100° C. In addition, the fluorescing dry toner particles prepared from these polymeric binders have a caking temperature of at least 50° C. so that the fluorescing dry toner particles can be stored for relatively long periods of time at fairly high temperatures without having individual particles agglomerate and clump together.

Useful polymeric binders for providing the polymeric binder phase include but are not limited to, polycarbonates, resin-modified malic alkyd polymers, polyamides, phenol-formaldehyde polymers and various derivatives thereof, polyester condensates, modified alkyd polymers, aromatic polymers containing alternating methylene and aromatic units, and fusible crosslinked polymers.

Other useful polymeric binders are vinyl polymers, such as homopolymers and copolymers derived from two or more ethylenically unsaturated polymerizable monomers. For example, useful copolymers can be derived one or more of styrene or a styrene derivative, vinyl naphthalene, p-chlorostyrene, unsaturated mono-olefins such as ethylene, propylene, butylene, and isobutylene, vinyl halides such as vinyl chloride, vinyl bromide, and vinyl fluoride, vinyl acetate, vinyl propionate, vinyl benzoate, vinyl butyrate, vinyl esters such as esters of mono carboxylic acids including acrylates and methacrylates, acrylonitrile, methacrylonitrile, acrylamides, methacrylamide, vinyl ethers such as vinyl methyl ether, vinyl isobutyl ether, and vinyl ethyl ether, N-vinyl indole, N-vinyl pyrrolidone, and others that would be readily apparent to one skilled in the electrophotographic polymer art.

For example, homopolymers and copolymers derived from styrene or styrene derivatives can comprise at least 40 weight % and to and including 100 weight % of recurring units derived from styrene or styrene derivatives (homologs) and from 0 and up to and including 40 weight % of recurring units derived from one or more lower alkyl acrylates or methacrylates (the term "lower alkyl" means alkyl groups having 1 to 6 carbon atoms). Other useful polymers include fusible styrene-acrylic copolymers that are partially crosslinked by incorporating recurring units derived from a divinyl ethylenically unsaturated polymerizable monomer such as divinylbenzene or a diacrylate or dimethacrylate. Polymeric binders of this type are described, for example, in U.S. Reissue Pat. No. 31,072 (Jadwin et al.) the disclosure of which is incorporated herein by reference. Mixtures of such polymeric binders can be used if desired.

Some useful polymeric binders are derived from styrene or another vinyl aromatic ethylenically unsaturated polymerizable monomer and one or more alkyl acrylates, alkyl methacrylates, or dienes wherein the styrene recurring units comprise at least 60% by weight of the polymer. For example, copolymers that are derived from styrene and either butyl acrylate or butadiene are also useful as polymeric binders, or these copolymers can be part of blends of polymeric binders. For example, a blend of poly(styrene-co-butyl acrylate) and polystyrene-co-butadiene) can be used wherein the weight ratio of the first polymeric binder to the second polymeric binder is from 10:1 and to and including 1:10, or from 5:1 and to and including 1:5.

Styrene-containing polymers are particularly useful and can be derived from one or more of styrene, α-methylstyrene, p-chlorostyrene, and vinyl toluene. Useful alkyl acrylates, alkyl methacrylates, and monocarboxylic acids that can be copolymerized with styrene or styrene derivatives include but are not limited to, acrylic acid, methyl acrylate, 2-ethylhexyl acrylate, 2-ethylhexyl methacrylate, ethyl acrylate, butyl acrylate, dodecyl acrylate, octyl acrylate, phenyl acrylate, methacrylic acid, ethyl methacrylate, butyl methacrylate, and octyl methacrylate.

Condensation polymers are also useful as polymeric binders in the visible fluorescing magenta dry toner particles. Useful condensation polymers include but are not limited to, polycarbonates, polyamides, polyesters, polywaxes, epoxy resins, polyurethanes, and polymeric esterification products of a polycarboxylic acid and a diol comprising a bisphenol. Particularly useful condensation polymeric binders include polyesters and copolyesters that are derived from one or more aromatic dicarboxylic acids and one or more aliphatic diols, including polyesters derived from isophthalic or terephthalic acid and diols such as ethylene glycol, cyclohexane dimethanol, and bisphenols (such as Bisphenol A). Other useful polyester binders can be obtained by the co-polycondensation polymerization of a carboxylic acid component comprising a carboxylic acid having two or more valencies, an acid anhydride thereof or a lower alkyl ester thereof (for example, fumaric acid, maleic acid, maleic anhydride, phthalic acid, terephthalic acid, trimellitic acid, or pyromellitic acid), using as a diol component a bisphenol derivative or a substituted compound thereof. Other useful polyesters are copolyesters prepared from terephthalic acid (including substituted terephthalic acid), a bis[(hydroxyalkoxy)phenyl]alkane having 1 to 4 carbon atoms in the alkoxy radical and from 1 to 10 carbon atoms in the alkane moiety (that can also be a halogen-substituted alkane), and an alkylene glycol having from 1 to 4 carbon atoms in the alkylene moiety. Specific examples of such condensation copolyesters and how they are made are provided for example in U.S. Pat. No. 5,120,631 (Kanbayashi et al.), U.S. Pat. No. 4,430,408 (Sitaramiah), and U.S. Pat. No. 5,714,295 (Wilson et al.), the disclosures of which are incorporated herein by reference for describing such polymeric binders. A useful polyester is a propoxylated bisphenol—A fumarate.

Useful polycarbonates are described in U.S. Pat. No. 3,694,359 (Merrill et al.) that is incorporated by reference, which polycarbonates can contain alklidene diarylene moieties in recurring units.

Other specific polymeric binders useful in the visible fluorescing magenta dry toner particles are described in [0031] of U.S. Patent Application Publication 2011/0262858 (noted above) the disclosure of which is incorporated herein by reference.

In some embodiments, the polymeric binder phase comprises a polyester or a vinyl polymer derived at least in part from styrene or a styrene derivative, both of which are described above.

In general, one or more polymeric binders are present in the fluorescing dry toner particles in an amount of at least 50 weight % and up to and including 80 weight %, or typically at least 60 weight % and up to and including 75 weight %, based on the total fluorescing dry toner particle weight.

The fluorescing dry toner particles used in this invention are not generally perfectly spherical so it is best to define them by the mean volume weighted diameter ($D_{vol}$) that can be determined as described above. Before fixing, the $D_{vol}$ can be at least 4 μm and up to and including 20 μm and typically at least 5 μm and up to and including 12 μm, but larger or smaller particles may be useful. Smaller particles may also be considered "liquid" toner particles.

The fluorescing yellow dry toner particles generally comprise one or more yellow fluorescing colorants, each emitting, upon irradiation at one or more peak wavelengths of at least 510 nm and up to and including 570 nm, or typically one or more peak wavelengths of at least 520 nm and up to and including 560 nm.

Useful yellow fluorescing colorants can be selected from classes of compounds chosen from the group consisting of coumarins, naphthalimides, perylenes, and anthrones. Such compounds can be obtained from various commercial sources, including but not limited to, Honeywell International (New Jersey), Union Pigment (Hongzhau, China), Dayglo Corporation (Ohio), Clariant Corporation (Rhode Island), H.W. Sands (Jupiter Fla.), Sun Chemicals (Ohio), and Risk Reactor (California).

The fluorescing magenta dry toner particles generally comprise one or more magenta fluorescing colorants, each emitting at one or more peak wavelengths of at least 510 nm and up to and including 590 nm, or typically one or more peak wavelengths of at least 520 nm and up to and including 580 nm.

Useful fluorescing magenta colorants can be selected from classes of compound that are chosen from the group consisting of rhodamines, perylenes, naphthalimides, and anthrones. Moreover, the useful fluorescing magenta colorants can be chosen from any of such pigments and dyes that are known in the art for emitting at one or more peak wavelengths of at least 510 nm and up to and including 590 nm. Such compounds can be readily determined from such sources including but not limited to, as Honeywell International (New Jersey), Union Pigment (Hongzhau, China), Dayglo Corporation (Ohio), Clariant Corporation (Rhode Island), H.W. Sands (Jupiter Fla.), Sun Chemicals (Ohio), and Risk Reactor (California).

For example, one useful fluorescing magenta colorant class are rhodamine class fluorescing magenta colorants, each of which has at least one $\lambda_{max}$ wavelength of at least 510 nm and up to and including 590 nm.

During the imaging methods described below, it is desirable to apply the fluorescing dry toner particles so that their covering power in the fluorescing toner highlight is at least 350 $cm^2/g$ and up to and including 1100 $cm^2/g$. Moreover, it is desired that the application of the fluorescing dry toner particles in each of the fluorescing toner highlights is such that the reflection density of the fluorescing dry toner particles is less than 1.

Mixtures of two or more of the same class or different classes of fluorescing colorants can be used if desired.

The one or more fluorescing colorants are generally present in the fluorescing dry toner particles in an amount of at least 5 weight % and up to and including 24 weight %, or typically at least 8 weight % and up to and including 20 weight %, based on the total fluorescing dry toner particle weight.

Various optional additives that can be present in the fluorescing dry toner particles can be added in the dry blend of polymeric resin particles and fluorescing colorants as described below. Such optional additives include but are not limited to, non-fluorescing colorants (such as dyes and pigments), charge control agents, waxes, fuser release aids, leveling agents, surfactants, stabilizers, or any combinations of these materials. These additives are generally present in amounts that are known to be useful in the electrophotographic art as they are known to be used in other dry toner particles, including dry color toner particles.

In some embodiments, a spacing agent, fuser release aid, flow additive particles, or combinations of these materials can be provided on the outer surface of the fluorescing dry toner particles, and such materials are provided in amounts that are known in the electrophotographic art. Generally, such materials are added to the fluorescing dry toner particles after they have been prepared using the dry blending, melt extrusion, and breaking process (described below).

Inorganic or organic non-fluorescing colorants (pigments or dyes) can be present in the fluorescing dry toner particles to provide any suitable color, tone, or hue other than fluorescing effect described herein. Most fluorescing dry toner particles used in the practice of this invention are free of non-fluorescing colorants (fluoresce to an insubstantial amount at the noted wavelengths).

Such non-fluorescing colorants can be incorporated into the polymeric binders in known ways, for example by including them in the dry blends described below. Useful colorants or pigments include but are not limited to the following compounds unless they are fluorescing colorants: titanium dioxide, carbon black, Aniline Blue, Calcoil Blue, Chrome Yellow, Ultramarine Blue, DuPont Oil Red, Quinoline Yellow, Methylene Blue Chloride, Malachite Green Oxalate, Lamp Black, Rose Bengal, Colour Index Pigment Red 48:1, Colour Index Pigment Red 57:1, Colour Index Pigment Yellow 97, Colour Index Pigment Yellow 17, Colour Index Pigment Blue 15:1, Colour Index Pigment Blue 15:3, phthalocyanines such as copper phthalocyanine, mono-chlor copper phthalocyanine, hexadecachlor copper phthalocyanine, Phthalocyanine Blue or Colour Index Pigment Green 7, and quinacridones such as Colour Index Pigment Violet 19 or Colour Index Pigment Red 122, and pigments such as HELIOGEN Blue™, HOSTAPERM Pink™, NOVAPERM Yellow™, LITHOL Scarlet™, MICROLITH Brown™, SUDAN Blue™, FANAL Pink™, and PV FAST Blue™. Mixtures of colorants can be used. Other suitable non-fluorescing colorants are described in U.S. Reissue Pat. No. 31,072 (noted above) and U.S. Pat. No. 4,160,644 (Ryan), U.S. Pat. No. 4,416,965 (Sandhu et al.), and U.S. Pat. No. 4,414,152 (Santilli et al.), the disclosures of which are incorporated herein by reference.

One or more of such non-fluorescing colorants can be present in the fluorescing dry toner particles in an amount of at least 1 weight % and up to and including 20 weight %, or typically at least 2 and up to and including 15 weight %, based on total fluorescing dry toner particle weight, but a skilled worker in the art would know how to adjust the amount of colorant so that the desired fluorescing highlight can be obtained when the fluorescing colorants are mixed with the non-fluorescing colorants.

The colorants can also be encapsulated using elastomeric resins that are included within the fluorescing dry toner particles. Such a process is described in U.S. Pat. No. 5,298,356 (Tyagi et al.) the disclosure of which is incorporated herein by reference.

The fluorescing dry toner particles can be used in various dry mono-component developers or dry two-component developers that are described in more detail below.

Suitable charge control agents and their use in toner particles are well known in the art as described for example in the *Handbook of Imaging Materials*, $2^{nd}$ Edition, Marcel Dekker, Inc., New York, ISBN: 0-8247-8903-2, pp. 180ff and references noted therein. The term "charge control" refers to a propensity of the material to modify the triboelectric charging properties of the fluorescing dry toner particles. A wide variety of charge control agents can be used as described in U.S. Pat. No. 3,893,935 (Jadwin et al.), U.S. Pat. No. 4,079,014 (Burness et al.), U.S. Pat. No. 4,323,634 (Jadwin et al.), U.S. Pat. No. 4,394,430 (Jadwin et al.), U.S. Pat. No. 4,624,907 (Motohashi et al.), U.S. Pat. No. 4,814,250 (Kwarta et al.), U.S. Pat. No. 4,840,864 (Bugner et al.), U.S. Pat. No. 4,834,920 (Bugner et al.), and U.S. Pat. No. 4,780,553 (Suzuka et al.), the disclosures of which are incorporated herein by reference. The charge control agents can be transparent or translucent and free of pigments and dyes. Generally, these compounds are colorless or nearly colorless. Mixtures of charge control agents can be used. A desired charge control agent can be chosen depending upon whether a positive or negative charging fluorescing dry toner particle is needed.

Examples of useful charge control agents include but are not limited to, triphenylmethane compounds, ammonium salts, aluminum-azo complexes, chromium-azo complexes, chromium salicylate organo-complex salts, azo-iron complex salts, an azo-iron complex salt such as ferrate (1-), bis[4-[5-chloro-2-hydroxyphenyl)azo]-3-hydroxy-N-phenyl-2-naphthalene-carboxamidato(2-)], ammonium, sodium, or hydrogen (Organoiron available from Hodogaya Chemical Company Ltd.). Other useful charge control agents include but are not limited to, acidic organic charge control agents such as 2,4-dihydro-5-methyl-2-phenyl-3H-pyrazol-3-one (MPP) and derivatives of MPP such as 2,4-dihydro-5-methyl-2-(2,4,6-trichlorophenyl)-3H-pyrazol-3-one, 2,4-dihydro-5-methyl-2-(2,3,4,5,6-pentafluorophenyl)-3H-pyrazol-3-one, 2,4-dihydro-5-methyl-2-(2-trifluoroethylphenyl)-3H-pyrazol-3-one and the corresponding zinc salts derived therefrom. Other examples include charge control agents with one or more acidic functional groups, such as fumaric acid, malic acid, adipic acid, terephthalic acid, salicylic acid, fumaric acid monoethyl ester, copolymers derived from styrene and methacrylic acid, copolymers of styrene and lithium salt of methacrylic acid, 5,5'-methylenedisalicylic acid, 3,5-di-t-butylbenzoic acid, 3,5-di-t-butyl-4-hydroxybenzoic acid, 5-t-octylsalicylic acid, 7-t-butyl-3-hydroxy-2-napthoic acid, and combinations thereof. Still other acidic charge control agents which are considered to fall within the scope of the invention include N-acylsulfonamides, such as, N-(3,5-di-t-butyl-4-hydroxybenzoyl)-4-chlorobenzenesulfonamide and 1,2-benzisothiazol-3(2H)-one 1,1-dioxide. Another class of charge control agents include, but are not limited to, iron organo metal complexes such as organo iron complexes, for example T77 from Hodogaya. Still another useful charge control agent is a quaternary ammonium functional acrylic polymer.

Other useful charge control agents include alkyl pyridinium halides such as cetyl pyridinium halide, cetyl pyridinium tetrafluoroborates, quaternary ammonium sulfate, and sulfonate charge control agents as described in U.S. Pat. No. 4,338,390 (Lu Chin) the disclosure of which is incorporated herein by reference, stearyl phenethyl dimethyl ammonium tosylates, distearyl dimethyl ammonium methyl sulfate, and stearyl dimethyl hydrogen ammonium tosylate.

One or more charge control agents can be present in the fluorescing dry toner particles in an amount to provide a consistent level of charge of at least −40 μCoulomb/g and to and including −65 μCoulomb/g for a toner particle having a $D_{vol}$ of 8 μm, when charged. Examples of suitable amounts include at least 0.1 weight % and up to and including 10 weight %, based on the total fluorescing dry toner particle weight.

Useful waxes (can also be known as lubricants) that can be present in the fluorescing dry toner particles include low molecular weight polyolefins (polyalkylenes) such as polyethylene, polypropylene, and polybutene, such as Polywax 500 and Polywax 1000 waxes from Peterolite, Clariant PE130 and Licowax PE190 waxes from Clariant Chemicals, and Viscol 550 and Viscol 660 waxes from Sanyo. Also useful are ester waxed that are available from Nippon Oil and Fat under the WE-series. Other useful waxes include silicone resins that can be softened by heating, fatty acid amides such as oleamide, erucamide, ricinoleamide, and stearamide, vegetable waxes such as carnauba wax, rice wax, candelilla wax, Japan wax, and jojoba wax, animal waxes such as bees wax, mineral and petroleum waxes such as montan wax, ozocerite, ceresine, paraffin wax, microcrystalline wax, and Fischer-Tropsch wax, and modified products thereof. Irrespective to the origin, waxes having a melting point in the range of at least 30° C. and up to and including 150° C. are useful. One or more waxes can be present in an amount of at least 0.1 weight % and up to and including 20 weight %, or at least 1 weight % and up to and including 10 weight %, based on the total fluorescing dry toner particle weight. These waxes, especially the polyolefins, can be used also as fuser release aids. In some embodiments, the fuser release aids are waxes having 70% crystallinity as measured by differential scanning calorimetry (DSC).

In general, a useful wax has a number average molecular weight ($M_n$) of at least 500 and up to and including 7,000. Polyalkylene waxes that are useful as fuser release aids can have a polydispersity of at least 2 and up to and including 10 or typically of at least 3 and up to and including 5. Polydispersity is a number representing the weight average molecular weight ($M_w$) of the polyalkylene wax divided by its number average molecular weight ($M_n$).

Useful flow additive particles that can be present inside or on the outer surface of the fluorescing dry toner particles include but are not limited to, a metal oxide such as hydrophobic fumed silica particles. Alternatively, the flow additive particles can be both incorporated into the fluorescing dry toner particles and on their outer surface. In general, such flow additive particles have an average equivalent spherical diameter (ESD) of at least 5 nm and are present in an amount of at least 0.01 weight % and up to and including 10 weight %, based on the total fluorescing dry toner particle weight.

Surface treatment agents can also be on the outer surface of the fluorescing dry toner particles in an amount sufficient to permit the fluorescing dry toner particles to be stripped from carrier particles in a dry two-component developer by electrostatic forces associated with the charged image or by mechanical forces. Surface fuser release aids can be present on the outer surface of the fluorescing dry toner particles in an amount of at least 0.05 weight % and up to and including 1 weight %, based on the total dry weight of fluorescing dry toner particles. These materials can be applied to the outer surfaces of the fluorescing dry toner particles using known methods for example by powder mixing techniques.

Spacing treatment agent particles ("spacer particles") can be attached to the outer surface by electrostatic forces or physical means, or both. Useful surface treatment agents include but are not limited to, silica such as those commercially available from Degussa as R972 and RY200 or from Wasker as H2000. Other suitable surface treatment agents include but are not limited to, titania, aluminum, zirconia, or other metal oxide particles, and polymeric beads all generally having an ECD of less than 1 μm. Mixture of these materials can be used if desired, for example a mixture of hydrophobic silica and hydrophobic titania particles.

Preparation of Dry Toner Particles

The fluorescing dry toner particles used in the practice of this invention can be prepared using any suitable manufacturing procedure wherein colorants are incorporated within the particles. Such manufacturing methods include but are not limited to, melt extrusion methods, coalescence, spray drying, and other chemical techniques. The fluorescing dry toners can be prepared as "chemically prepared toners," "polymerized toners," or "in-situ toners." They can be prepared using controlled growing instead of grinding. Various chemical processes include suspension polymers, emulsion aggregation, micro-encapsulation, dispersion, and chemical milling. Details of such processes are described for example in the literature cited in [0010] of U.S. Patent Application Publication 2010/0164218 (Schulze-Hagenest et al.) the disclosure of which is incorporated herein by reference. Such dry toner particles can also be prepared using limited coalescence process as described in U.S. Pat. No. 5,298,356 (Tyagi et al.) the disclosure of which is incorporated herein by reference, or a water-in-oil-in-water double emulsion process as described in U.S. Patent Application Publication 2011/0262858 (Nair et al.) the disclosure of which is incorporated herein by reference, especially if porosity is desired in the fluorescing dry toner particles. Another method for preparing fluorescing dry toner particles is by a spray/freeze drying technique as described in U.S. Patent Application Publication 2011/0262654 (Yates et al.).

In a particularly useful manufacturing method, a desired polymer binder (or mixture of polymeric binders) for use in the fluorescing dry toner particles is produced independently using a suitable polymerization process known in the art. The one or more polymeric binders are dry blended or mixed as polymeric resin particles with fluorescing colorants to form a dry blend. The optional additives, such as charge control agents, waxes, fuser release aids, and non-fluorescing colorants are also incorporated into the dry blend with the two essential components. The amounts of the essential and optional components can be adjusted in the dry blend in a suitable manner that a skilled worker would readily understand to provide the desired amounts in the resulting fluorescing dry toner particles. The conditions for mechanical dry blending are known in the art.

For example, the method can comprise dry blending the polymeric resin particles with the fluorescing colorant(s), such as fluorescing magenta or fluorescing yellow colorants as described above, and a charge control agent, and optionally with a wax or colorant, or any combination of these optional components, to form a dry blend. The dry blend can be prepared by mechanically blending the components for a suitable time to obtain a uniform dry mix.

The dry blend is then melt processed in a suitable apparatus such as a two-roll mill or hot-melt extruder. In some embodiments, the dry melt is extruded under low shear conditions in an extrusion device to form an extruded composition. However, these low shear conditions are not always required in the practice of this invention. The melt processing time can be from 1 minute to and including 60 minutes, and the time can be adjusted by a skilled worker to provide the desired melt processing temperature and uniformity in the resulting extruded composition.

For example, it is useful to melt extrude a dry blend of the noted components that has a viscosity of at least 90 pascals sec and up to and including 2300 pascals sec, or typically of at least 150 pascals sec and up to and including 1200 pascals sec.

Generally, the dry blend is melt extruded in the extrusion device at a temperature higher than the glass transition temperature of the one or more polymeric binders used to form the polymeric binder phase, and generally at a temperature of at least 90° C. and up to and including 240° C. or typically of at least 120° C. and up to and including 160° C. The temperature results, in part, from the frictional forces of the melt extrusion process.

The resulting extruded composition (sometimes known as a "melt product" or a "melt slab") is generally cooled, for example, to room temperature, and then broken up (for example pulverized) into fluorescing dry toner particles having the desired $D_{vol}$ as described above. It is generally best to first grind the extruded composition prior to a specific pulverizing operation. Grinding can be carried out using any suitable procedure. For example, the extruded composition can be crushed and then ground using for example a fluid energy or jet mill as described for example in U.S. Pat. No. 4,089,472 (Seigel et al.). The particles are then further reduced in size by using high shear pulverizing devices such as a fluid energy mill, and then classified as desired.

The resulting fluorescing dry toner particles can then be surface treated with suitable hydrophobic flow additive particles having an equivalent circular diameter (ECD) of at least 5 nm to affix such hydrophobic flow additive particles on the outer surface of the particles. These hydrophobic flow additive particles can be composed of metal oxide particles such as hydrophobic fumed oxides such as silica, alumina, or titania in an amount of at least 0.01 weight % and up to and including 10 weight % or typically at least 0.1 weight % and up to and including 5 weight %, based on the total fluorescing dry toner particle weight.

In particular, a hydrophobic fumed silica such as R972 or RY200 (from Nippon Aerosil) can be used for this purpose, and the amount of the fumed silica particles can be as noted above, or more typically at least 0.1 weight % and up to and including 3 weight %, based on the total fluorescing dry toner particle weight.

The hydrophobic flow additive particles can be added to the outer surface of the fluorescing dry toner particles by mixing both types of particles in an appropriate mixer.

The resulting treated fluorescing dry toner particles can be classified (sieved) through a 230 mesh vibratory sieve to remove non-attached silica particles and silica agglomerates and any other components that may not have been incorporated into the fluorescing dry toner particles. The temperature during the surface treatment can be controlled to provide the desired attachment and blending.

Color dry toner particles useful in the practice of this invention can be prepared in various ways as described above, including the melt extrusion processes described above for the fluorescing dry toner particles.

While the color dry toner particles can have some fluorescing properties, generally they are non-fluorescing in nature. Thus, the color dry toner images can be provided by forming non-fluorescing cyan, non-fluorescing yellow, non-fluorescing magenta, and non-fluorescing black toner images in the color areas of the color toner image.

The various non-fluorescing dry color toner particles can be prepared using a suitable polymeric binder phase comprising one or more polymeric binders (as described above) and one or more of non-fluorescing cyan, non-fluorescing yellow, non-fluorescing magenta, or non-fluorescing black colorants. For example, such colorants can be in principle any of the colorants described in the Colour Index, Vols. I and II, $2^{nd}$ Edition (1987) or in the Pantone® Color Formula Guide, $1^{st}$ Edition, 2000-2001. The choice of particular non-fluorescing colorants for the cyan, yellow, magenta, and black (CYMK) color toners is well described in the art, for example in the proceedings of *IS&T NIP* 20: International Conference on Digital Printing Technologies, IS&T: The Society for Imaging Science and Technology, 7003 Kilworth Lane, Springfield, Va. 22151 USA ISBM: 0-89208-253-4, p. 135. Carbon black is generally useful as the black toner colorant while other colorants for the CYM color toners include but are not limited to, red, blue, and green pigments, respectively. Specific colorants can include copper phthalocyanine and Pigment Blue that can be obtained as Lupreton Blue™ SE1163. Other colorants useful in non-fluorescing dry color toners are also described above as non-fluorescing colorants for the visible fluorescing magenta dry toner particles.

The amount of one or more non-fluorescing colorants in the non-fluorescing dry color toners can vary over a wide range and a skilled worker in the art would know how to pick the appropriate amount for a given non-fluorescing colorant or mixture of colorants. In general, the total non-fluorescing colorants in each non-fluorescing dry color toner particles can be at least 1 weight % and up to and including 40 weight %, or typically at least 3 weight % and up to and including 25 weight %, based on the total dry color toner particle weight. The non-fluorescing colorant in each non-fluorescing dry color toner can also have the function of providing charge control, and a charge control agent (as described above) can also provide coloration. All of the optional additives described above for the fluorescing dry toner particles used in this invention can likewise be used in the non-fluorescing dry color toners.

Developers

The fluorescing dry toner particles used in this invention can be used as a dry mono-component developer, or combined with carrier particles to form dry two-component developers. In all of these embodiments, a plurality (usually thousands or millions) of individual fluorescing dry toner particles are used together.

Such dry mono-component or dry two-component developers generally comprise a charge control agent, wax, lubricant, fuser release aid, or any combination of these materials within the fluorescing dry toner particles, or they can also include flow additive particles on the outer surface of the particles. Such components are described above.

Useful dry one-component developers generally include the fluorescing dry toner particles as the essential component. Dry two-component developers generally comprise carrier particles (also known as carrier vehicles) that are known in the electrophotographic art and can be selected from a variety of materials. Carrier particles can be uncoated carrier core particles (such as magnetic particles) and core magnetic particles that are overcoated with a thin layer of a film-forming polymer such as a silicone resin type polymer, poly(vinylidene fluoride), poly(methyl methacrylate), or mixtures of poly(vinylidene fluoride) and poly(methyl methacrylate).

The amount of fluorescing dry toner particles in a two-component developer can be at least 4 weight % and up to and including 20 weight % based on the total dry weight of the two-component dry developer.

Image Formation Using Fluorescing Dry Toner Particles

The fluorescing dry toner particles described herein can be applied to a suitable receiver material (or substrate) of any type to provide fluorescing highlights in selected portions of non-color image areas using various methods such as a digital printing process such as an electrostatic printing process, or electrophotographic printing process as described in L. B. Schein, *Electrophotography and Development Physics,* $2^{nd}$ Edition, Laplacian Press, Morgan Hill, Calif., 1996 (ISBN 1-885540-02-7), or by an electrostatic coating process as described for example in U.S. Pat. No. 6,342,273 (Handels et al.) that is incorporated herein by reference. In some embodiments, developed latent images can be directly transferred to the "final" receiver element and then fixed to that receiver element.

Such receiver materials include, but are not limited to, coated or uncoated papers (cellulosic or polymeric papers), transparent polymeric films, ceramics, paperboard, cardboard, metals, fibrous webs or ribbons, and other substrate materials that would be readily apparent to one skilled in the art. In particular, the receiver materials (also known as the final receiver material) can be sheets of paper or polymeric films that are fed from a supply of receiver materials.

For example, the fluorescing dry toner particles (for example fluorescing magenta dry toner particles and fluorescing yellow dry toner particles) can be applied to a receiver material by a digital printing process such as an electrostatic printing process that includes but is not limited to, an electrophotographic printing process, or by a coating process such as an electrostatic coating process including an electrostatic brush coating as described in U.S. Pat. No. 6,342,273 (noted above), the disclosure of which is incorporated herein by reference.

In one electrophotographic method, a latent image (that is an electrostatic latent image) can be formed on a primary imaging member such as a charged photoconductor belt or roller using a suitable light source such as a laser or light emitting diode. This latent image is then developed on the primary imaging member by bringing the latent image into close proximity with a dry one-component or dry two-component developer comprising the fluorescing dry toner particles described herein to form one or more highlight fluorescing dry toner images on the primary imaging member.

In the embodiments of multi-color printing, multiple photoconductors can be used, each developing a composite color dry toner image in the color areas of the color image, and another photoconductor for developing the fluorescing dry toner image in the non-color image areas of the composite color image. Alternatively, a single photoconductor can be used with multiple developing stations where after each latent color toner images and fluorescing toner image is developed in the appropriate areas, and then it is transferred directly to the receiver material, or it is transferred to an intermediate transfer member (belt or rubber) and then to the receiver material after all of the toner images have been accumulated on the intermediate transfer member.

In some embodiments, it is desirable to develop and fix the latent color image(s) with sufficient color dry toner particles to form a composite non-fluorescing color toner image (for example, CYMK) at a lay down of at least 1500 $cm^2/g$ and up to and including 2300 $cm^2/g$. The fluorescing dry toner particles are developed and fixed to provide fluorescing highlights at a covering power of at least 350 $cm^2/g$ and up to and including 1100 $cm^2/g$.

In more particular embodiments, the covering power of the fluorescing dry toner particles in the fluorescing highlights is at least 400 $cm^2/g$ and up to and including 600 $cm^2/g$, and the covering power of each of the non-fluorescing cyan, non-fluorescing yellow, non-fluorescing magenta, and non-fluorescing black toner particles is at least 1700 $cm^2/g$ and up to and including 2100 $cm^2/g$.

While a developed dry toner image can be transferred to a final receiver (receiver material) using a thermal or thermal assist process as is known in the art, it is generally transferred using an electrostatic process including an electrophotographic process such as that described in L. B. Schein, *Electrophotography and Development Physics,* $2^{nd}$ Edition, Laplacian Press, Morgan Hill, Calif., 1996. The electrostatic transfer can be accomplished using a corona charger or an electrically biased transfer roller to press the receiver material into contact with the primary imaging member while applying an electrostatic field. In an alternative embodiment, a developed toner image can be first transferred from the primary imaging member to an intermediate transfer member (belt or roller) that serves as a receiver material, but not as the final receiver material, and then transferred from the intermediate transfer member to the final receiver material.

Electrophotographic color printing generally includes subtractive color mixing wherein different printing stations in a given apparatus are equipped with non-fluorescing cyan, non-fluorescing yellow, non-fluorescing magenta, and non-fluorescing black toner particles, in any desired toning or imaging sequence. Thus, a plurality of toner images of different non-fluorescing colors can be applied to the same primary imaging member (such as dielectric member), intermediate transfer member, and final receiver material, including one or more non-fluorescing composite color images while selected portions of the non-color image areas are highlighted using the fluorescing dry toner particles described herein. Such different toner images are generally applied or transferred to the final receiver material in a desired sequence or succession using successive toner application or printing stations as described below.

The various transferred toner images are then fixed (thermally fused) on the receiver material in order to permanently affix them to the receiver material. This fixing can be done using various means such as heating alone (non-contact fixing) using an oven, hot air, radiant, or microwave fusing, or by passing the toner image(s) through a pair of heated rollers (contact fixing) to thereby apply both heat and pressure to the toner image(s) containing toner particles. Generally, one of the rollers is heated to a higher temperature and can have an optional release fluid to its surface. This roller can be referred to as the fuser roller, and the other roller is generally heated to a lower temperature and usually serves the function of applying pressure to the nip formed between the rollers as the toner image(s) is passed through. This second roller can be referred to as a pressure roller. Whatever fixing means is used, the fixing temperature is generally higher than the glass transition temperature of the various toner particles, which $T_g$ can be at least 45° C. and up to and including 90° C. or at least 50° C. and up to and including 70° C. Thus, fixing is generally at a temperature of at least 95° C. and up to and including 220° C. or more generally at a temperature of at least 135° C. and up to and including 210° C.

As the developed toner image(s) on the receiver material is passed through the nip formed between the two rollers, the various fluorescing and non-fluorescing dry toner particles are softened as their temperature is increased upon contact with the fuser roller. The melted toner particles generally remain affixed on the surface of the receiver material.

For example, the method of this invention can comprise:

forming a non-fluorescing cyan, non-fluorescing yellow, non-fluorescing magenta, and non-fluorescing black dry toner images, in any desired sequence, in a composite non-fluorescing color image in color image areas on a receiver material, then forming the fluorescing dry toner image in selected portions of the non-color image areas, to provide highlights on the receiver material, and fixing both the composite non-fluorescing color toner image and the fluorescing dry toner image to the receiver material.

It is advantageous that the present invention can be used in a printing apparatus with multiple printing stations, for example where the fluorescing dry toner particles can be applied to a receiver material at any printing station.

Certain embodiments of the invention where multiple color toner images are printed along with the fluorescing dry toner image can be achieved using a printing machine that incorporates at least five printing stations or printing units. For example, the printing method can comprise forming composite non-fluorescing cyan (C), non-fluorescing yellow (Y), and non-fluorescing magenta (M) toner images, in any desired sequence, or composite non-fluorescing black (K), non-fluorescing yellow (Y), non-fluorescing magenta (M), and non-fluorescing cyan (C) toner images, and the fluorescing highlights(s) is formed last, on the receiver material using at least five sequential toner stations in a color electrophotographic printing machine.

For example, in some embodiments of the printed receiver material that can be obtained using the present invention:

the fused fluorescing dry toner particles providing the one or more fluorescing highlights are fluorescing magenta dry toner particles that emit at one or more peak wavelengths of at least 510 nm and up to and including 590 nm, the fused fluorescing dry toner particles providing the one or more fluorescing highlights are fluorescing yellow dry toner particles that emit at one or more peak wavelengths of at least 510 nm and up to and including 570 nm, or the printed receiver material comprises one or more fluorescing highlights provided by the fluorescing magenta dry toner particles, and one or more different highlights provided by the fluorescing yellow dry toner particles.

A useful printing machine is illustrated in FIG. 1 of the present application. FIG. 1 is a side elevational view schematically showing portions of a typical electrophotographic print engine or printer apparatus suitable for printing of one or more toner images. An electrophotographic printer apparatus 100 has a number of sequentially arranged electrophotographic image forming printing modules M1, M2, M3, M4, and M5. Each of the printing modules generates a single dry toner image for transfer to a receiver material successively moved through the modules. Each receiver material, during a single pass through the five modules, can have transferred in registration thereto up to five single toner images. A composite color toner image formed on a receiver material can comprise combinations or subsets of the CYMK color toner images, in any desired sequence, and the fluorescing dry toner particles described herein, on the receiver material in non-color image areas on the receiver material. In a particular embodiment, printing module M1 forms black (K) toner color separation images, M2 forms yellow (Y) toner color separation images, M3 forms magenta (M) toner color separation images, and M4 forms cyan (C) toner color separation images. Printing module M5 can form the fluorescing magenta or fluorescing yellow toner image that provides highlights in selected portions on the receiver material.

Receiver materials 5 as shown in FIG. 1 are delivered from a paper supply unit (not shown) and transported through the printing modules M1-M5. The receiver materials are adhered [for example electrostatically using coupled corona tack-down chargers (not shown)] to an endless transport web 101 entrained and driven about rollers 102 and 103.

Each of the printing modules M1-M5 includes a photoconductive imaging roller 111, an intermediate transfer roller 112, and a transfer backup roller 113, as is known in the art. For example, at printing module M1, a particular toner separation image can be created on the photoconductive imaging roller 111, transferred to intermediate transfer roller 112, and transferred again to a receiver member 5 moving through a transfer station, which transfer station includes intermediate transfer roller 112 forming a pressure nip with a corresponding transfer backup roller 113.

A receiver material can sequentially pass through the printing modules M1 through M5. In each of the printing modules a toner separation image can be formed on the receiver material 5 to provide the desired enhanced composite color toner image described herein.

Printing apparatus 100 has a fuser of any well known construction, such as the shown fuser assembly 60 using fuser rollers 62 and 64. Even though a fuser 60 using fuser rollers 62 and 64 is shown, it is noted that different non-contact fusers using primarily heat for the fusing step can be beneficial as they can reduce compaction of toner layers formed on the receiver material 5, thereby enhancing tactile feel.

A logic and control unit (LCU) 230 can include one or more processors and in response to signals from various sensors (CONT) associated with the electrophotographic printer apparatus 100 provides timing and control signals to the respective components to provide control of the various components and process control parameters of the apparatus as known in the art.

Although not shown, the printer apparatus 100 can have a duplex path to allow feeding a receiver material having a fused toner image thereon back to printing modules M1 through M5. When such a duplex path is provided, two sided printing on the receiver material or multiple printing on the same side is possible.

Operation of the printing apparatus 100 will be described. Image data for writing by the printer apparatus 100 are received and can be processed by a raster image processor (RIP), which can include a color separation screen generator or generators. The image data include information to be formed on a receiver material, which information is also processed by the raster image processor. The output of the RIP can be stored in frame or line buffers for transmission of the color separation print data to each of the respective printing modules M1 through M5 for printing color separations in the desired order. The RIP or color separation screen generator can be a part of the printer apparatus or remote therefrom. Image data processed by the RIP can at least partially include data from a color document scanner, a digital camera, a computer, a memory or network. The image data typically include image data representing a continuous image that needs to be reprocessed into halftone image data in order to be adequately represented by the printer.

While these embodiments refer to a printing machine comprising five sets of single toner image producing or printing stations or modules arranged in tandem (sequence), a printing machine can be used that includes more or less than five printing stations to provide a composite color toner image and fluorescing highlights on the receiver material. Useful printing machines also include other electrophotographic writers or printer apparatus.

The present invention provides at least the following embodiments and combinations thereof, but other combinations of features are considered to be within the present invention as a skilled artisan would appreciate from the teaching of this disclosure:

1. A method for providing a highlighted color toner image, the method comprising:

developing one or more color latent images using corresponding color toner particles to form a composite color toner image on a first receiver material, prior to or subsequently to developing the composite color toner image on the first receiver material, developing one or more selected portions of non-color image areas on the first receiver material with fluorescing dry toner particles to provide a developed fluorescing toner highlight in the one or more selected portions of the non-color image areas, transferring the composite color toner image and the one or more developed fluorescing toner highlight in the one or more non-color image areas, to a final receiver material to form a composite color toner image and a fluorescing toner highlight in the one or more selected portions of the non-color image areas, and fixing the composite color toner image and the fluorescing toner highlight on the final receiver material, wherein, before fixing, each fluorescing dry toner particle comprises a polymeric binder phase and a fluorescing colorant that emits at one or more peak wavelengths of at least 420 nm and up to and including 690 nm and that is dispersed within the polymeric binder phase.

2. The method of embodiment 1, wherein the fluorescing toner dry particles have a mean volume weighted diameter ($D_{vol}$) of at least 4 μm and up to and including 20 μm.

3. The method of embodiment 1 or 2, wherein the fluorescing dry toner particles comprise a yellow fluorescing colorant that emits at one or more peak wavelengths of at least 510 nm and up to and including 570 nm.

4. The method of any of embodiments 1 to 3, wherein the fluorescing dry toner particles comprise a yellow fluorescing colorant that is selected from the group consisting of coumarins, naphthalimides, perylenes, and anthrones.

5. The method of embodiment 1 or 2, wherein the fluorescing dry toner particles comprise a magenta fluorescing colorant that emits at one or more peak wavelengths of at least 510 nm and up to and including 590 nm.

6. The method of embodiment 1, 2, or 5, wherein the fluorescing dry toner particles comprise a magenta fluorescing colorant that is selected from the group consisting of rhodamines, perylenes, naphthalimides, and anthrones.

7. The method of any of embodiments 1 to 6, wherein the covering power of the fluorescing dry toner particles in the fluorescing toner highlight is at least 350 $cm^2/g$ and up to and including 1100 $cm^2/g$.

8. The method of any of embodiments 1 to 7, wherein the reflection density of the fluorescing dry toner particles in the fluorescing toner highlight is less than 1.

9. The method of any of embodiments 1 to 8, wherein the fluorescing colorant is present in the fluorescing dry toner particles in an amount of at least 5 weight % and up to and including 24 weight %, based on the total fluorescing dry toner particle weight.

10. The method of any of embodiments 1 to 9, wherein the fluorescing dry toner particles have a mean volume weighted diameter ($D_{vol}$) before fixing of at least 5 μm and up to and including 12 μm.

11. The method of any of embodiments 1 to 10, wherein the fluorescing dry toner particles further comprise a charge control agent, wax, lubricant, fuser release aid, or any combination of these materials.

12. The method of any of embodiments 1 to 11, wherein the fluorescing dry toner particles further comprise, on their outer surface, a fuser release aid, flow additive particles, or both of these materials.

13. The method of any of embodiments 1 to 12, wherein the receiver material is a sheet of paper or a polymeric film.

14. The method of any of embodiments 1 to 13, comprising forming non-fluorescing cyan, non-fluorescing yellow, non-fluorescing magenta, and non-fluorescing black toner images in the composite color toner image.

15. The method of any of embodiments 1 to 14, comprising:

prior to or subsequently to developing the composite color toner image, applying fluorescing magenta dry toner particles in one or more selected portions of non-color image areas to provide a fluorescing magenta toner highlight in the one or more selected portions of non-color image areas, prior to or subsequently to applying the fluorescing magenta dry toner particles, applying fluorescing yellow dry toner particles in one or more different selected portions of non-color image areas to provide a fluorescing yellow toner highlight in the one or more different selected portions of the non-color image areas, transferring the composite color toner image and fluorescing magenta toner highlight and fluorescing yellow toner highlight to a receiver material, and fixing the transferred composite color toner image and fluorescing magenta toner highlight and fluorescing yellow toner highlight to the receiver material.

16. A printed receiver material provided by the method of any of embodiments 1 to 15, comprising one or more printed composite color toner images comprising fused color toner particles, and fused fluorescing dry toner particles providing one or more fluorescing toner highlights in non-color image areas.

17. The printed receiver material of embodiment 16, wherein:

the fused fluorescing dry toner particles providing the one or more fluorescing highlights are fluorescing magenta dry toner particles that emit at one or more peak wavelengths of at least 510 nm and up to and including 590 nm, the fused fluorescing dry toner particles providing the one or more fluorescing highlights are fluorescing yellow dry toner particles that emit at one or more peak wavelengths of at least 510 nm and up to and including 570 nm, or the printed receiver material comprises one or more fluorescing highlights provided by the fluorescing magenta dry toner particles, and one or more different highlights provided by the fluorescing yellow dry toner particles.

The following Examples are provided to illustrate the practice of this invention and are not meant to be limiting in any manner.

Dry toner particles were prepared using a polymeric binder resins particles that were melt processed in a two roll mill or extruder with appropriate colorants and addenda. A preformed mechanical blend of particulate polymer resin particles, colorants, and toner additives can also be prepared and then roll milled or extruded. Roll milling, extrusion, or other melt processing was performed at a temperature sufficient to achieve a uniform melt processed composition. This composition, referred to as a "melt product" or "melt slab" was then cooled to room temperature. For a polymeric binder having a $T_g$ in the range of from 50° C. to 120° C., or a $T_m$ in the range of from 65° C. to 200° C., a melt blending temperature of from 90° C. to 240° C. was suitable using a roll mill or extruder. The melt blending times (that is, the exposure period for melt blending at elevated temperature) was in the range of from 1 minute to 60 minutes.

The components were dry powder blended in a 40 liter Henschel mixer for 60 seconds at 1000 RPM to produce a homogeneous dry blend that was then melt compounded in a twin screw co-rotating extruder to melt the polymer binder and disperse the pigments, charge agents, and waxes uniformly within the resulting polymeric binder phase. Melt compounding was done at a temperature of 110° C. at the extruder inlet, increasing to 196° C. in the extruder compounding zones, and 196° C. at the extruder die outlet. The melt extrusion conditions were a powder blend feed rate of 10 kg/hr and an extruder screw speed of 490 RPM. The extruded composition (extrudate) was cooled to room temperature and then broken into about 0.32 cm size granules.

These granules were then finely ground in an air jet mill to a $D_{vol}$ of 8 μm as determined using a Coulter Counter Multisizer. The finely ground toner particles were then classified in a centrifugal air classifier to remove very small particles and fines that were not desired in the finished dry toner composition. After classification, the toner particles had a particle size distribution with a width, expressed as the diameter at the 50% percentile/diameter at the 16% percentile of the cumulative particle number versus particle diameter, of 1.30 to 1.35.

The classified toner particles were then surface treated with fumed hydrophobic silica (Aerosil® R972 from Nippon Aerosil) wherein 2000 grams of toner particles were mixed with 20 grams of the fumed hydrophobic silica so that 1 weight % silica was attached to the toner particles, based on total toner particle weight using a 10 liter Henschel mixer with a 3-element impeller for 2 minutes at 2000 RPM.

The silica surface-treated toner particles were sieved using a 300 mesh vibratory sieve to remove non-dispersed silica agglomerates and any toner particle flakes that may have formed during the surface treatment process.

The melt extrusion composition was cooled and then pulverized to a $D_{vol}$ of from about 5 μm to about 20 μm. It is generally preferred to first grind the melt extrusion composition prior to a specific pulverizing operation using any convenient grinding procedure. For example, the solid melt extrusion composition can be crushed and then ground using, for example, a fluid energy or jet mill, such as described in U.S. Pat. No. 4,089,472 (noted above) and the ground particles can then be classified in one or more steps. If necessary, the size of the particles can be further reduced by use of a high shear pulverizing device such as a fluid energy mill and classified again.

Two-component electrographic developers were prepared by mixing toner particles prepared as described above with hard magnetic ferrite carrier particles coated with silicone resin as a concentration of 8 weight % toner particles and 92 weight % carrier particles.

Invention Example 1

A fluorescing magenta (pink) dry toner formulation was made with 12,000 g of Reichhold Atlac 382 ES polyester resin, 2200 g of Dayglo WRT-11 Aquabest Pink visible magenta fluorescing colorant, and 293 g of Orient Bontron E-84 charge control agent.

These components were dry blended using a 40 liter Henschel mixer for 60 seconds at 1000 RPM to produce a homogeneous dry blend. The dry blend was then melt compounded in a twin screw co-rotating extruder to melt the polymer binder and disperse the fluorescing colorants, and charge control agent at a temperature of 110° C. at the extruder inlet, 110° C. increasing to 196° C. in the extruder compounding zones, and 196° C. at the extruder die outlet. The processing conditions were a powder blend feed rate of 10 kg/hr and an extruder screw speed of 490 RPM. The cooled extrudate was then chopped to approximately 0.32 cm size granules.

These granules were then finely ground in an air jet mill to an 8 μm $D_{vol}$ as measured using a Coulter Counter Multisizer. The finely ground toner particles were then classified in a centrifugal air classifier to remove very small toner particles and toner fines that are not desired. After this classification, the visible fluorescing magenta toner product had a particle size distribution with a width, expressed as the diameter at the 50% percentile/diameter at the 16% percentile of the cumulative particle number versus $D_{vol}$ of 1.30 to 1.35.

The classified toner was then surface treated with fumed silica, a hydrophobic silica (Aerosil® R972 manufactured by Nippon Aerosil) by mixing 2000 g of the visible fluorescing magenta dry toner particles with 20 g of the silica to give a dry toner product containing 1.0 weight % silica in a 10 liter Henschel mixer with a 4 element impeller for 2.5 minutes at 3000 RPM. The silica surface-treated visible fluorescing magenta toner particles were sieved through a 300 mesh vibratory sieve to remove non-dispersed silica agglomerates and any toner flakes that may have formed during the surface treatment process.

A two-component dry developer was prepared by combining 100 g of the noted toner particles with 1200 g of carrier particles comprising strontium ferrite cores that had been coated at 230° C. with 0.75 parts of poly(vinylidene fluoride) (Kynar™ 301F manufactured by Pennwalt Corporation) and 0.50 parts of poly(methyl methacrylate) (Soken 1101 distributed by Esprix Chemicals). The two-component dry developer were then used in the fifth printing station (toner imaging unit) of a NexPress™ 3000 Digital Color Printing Press containing non-fluorescing cyan, non-fluorescing magenta, non-fluorescing yellow, and non-fluorescing black toner particles in the first four printing stations. After application of the various toner particles to paper sheets as the receiver material, and fixing, the covering power for these non-fluorescing color toners was measured at 1650 $cm^2/g$, 1700 $cm^2/g$, 2200 $cm^2/g$ and 1800 $cm^2/g$ respectively, in the resulting printed composite color toner image. The covering power of the fluorescing magenta (pink) toner particles was measured at 400 $cm^2/g$ in the resulting fluorescing magenta highlights.

It was evident that the presence of the visible fluorescing magenta toner particles in the enhanced color toner images provided a "pinkish" effect to the color toner image. This fluorescing effect can be varied by using variations of amounts of fluorescing and non-fluorescing toner particles, visible fluorescing colorant, and other features that are described above.

Invention Example 2

A fluorescing yellow dry toner formulation was made with 12,000 g of Reichhold Atlac 382 ES polyester resin, 2200 grams of Dayglo HMS-34 Strong yellow fluorescent colorant, and 293 g of Orient Bontron E-84 charge control agent.

These components were dry blended using a 40 liter Henschel mixer for 60 seconds at 1000 RPM to produce a homogeneous dry blend. The dry blend was then melt compounded in a twin screw co-rotating extruder to melt the polymer binder and disperse the fluorescing colorant, and charge control agent at a temperature of 110° C. at the extruder inlet, 110° C. increasing to 196° C. in the extruder compounding zones, and 196° C. at the extruder die outlet. The processing conditions were a powder blend feed rate of 10 kg/hr and an extruder screw speed of 490 RPM. The cooled extrudate was then chopped to approximately 0.32 cm size granules.

These granules were then finely ground in an air jet mill to an 8 μm $D_{vol}$ as measured using a Coulter Counter Multisizer. The finely ground toner particles were then classified in a centrifugal air classifier to remove very small toner particles and toner fines that are not desired. After this classification, the fluorescing yellow toner product had a particle size distribution with a width, expressed as the diameter at the 50% percentile/diameter at the 16% percentile of the cumulative particle number versus $D_{vol}$ of 1.30 to 1.35.

The classified toner was then surface treated with fumed silica, a hydrophobic silica (Aerosil® R972 manufactured by Nippon Aerosil) by mixing 2000 g of the fluorescing yellow dry toner particles with 20 g of the silica to give a dry toner product containing 1.0 weight % silica in a 10 liter Henschel mixer with a 4 element impeller for 2.5 minutes at 3000 RPM. The silica surface-treated fluorescing yellow toner particles were sieved through a 300 mesh vibratory sieve to remove non-dispersed silica agglomerates and any toner flakes that may have formed during the surface treatment process.

A two-component dry developer was prepared by combining 100 g of the noted toner particles with 1200 g of carrier particles comprising strontium ferrite cores that had been coated at 230° C. with 0.75 parts of poly(vinylidene fluoride) (Kynar™ 301F manufactured by Pennwalt Corporation) and 0.50 parts of poly(methyl methacrylate) (Soken 1101 distributed by Esprix Chemicals).

The two-component dry developer were then used in the fifth printing station (toner imaging unit) of a NexPress™ 3000 Digital Color Printing Press containing non-fluorescing cyan, non-fluorescing magenta, non-fluorescing yellow, and non-fluorescing black toner particles in the first four printing stations. After application of the various dry toner particles to paper sheets as the receiver material, and fixing, the covering power for these non-fluorescing color toners was measured at 1650 $cm^2/g$, 1700 $cm^2/g$, 2200 $cm^2/g$ and 1800 $cm^2/g$ respectively, in the resulting composite color toner image. The covering power of the fluorescing yellow dry toner particles in the printed fluorescing yellow highlights was measured at 625 $cm^2/g$.

The invention has been described in detail with particular reference to certain preferred embodiments thereof, but it will be understood that variations and modifications can be effected within the spirit and scope of the invention.

The invention claimed is:

1. A printed receiver material comprising a receiver material having thereon:

one or more non-fluorescing composite color toner images comprising fused non-fluorescing color toner particles, each of the one or more non-fluorescing composite color toner images having an optical density of at least 0.2 provided by one or more non-fluorescing colorants, and one or more fluorescing toner highlights in one or more selected portions of non-color image areas outside the one or more non-fluorescing composite color toner images, each of the one or more selected portions of the non-color image areas having an optical density of less than 0.05 provided by one or more non-fluorescing colorants, but each of the one or more fluorescing toner highlights having an optical density of at least 0.2, the one or more fluorescing toner highlights comprising fused fluorescing dry toner particles, wherein the fused fluorescing dry toner particles comprise a fluorescent colorant that emits at one or more peak wavelengths of at least 420 nm and up to and including 690 nm, the covering power of the fused fluorescing dry toner particles in the one or more fluorescing toner highlights is at least 350 $cm^2/g$ and up to and including 1100 $cm^2/g$, and the covering power of the fused fluorescing dry toner particles in the one or more fluorescing toner highlights is at least 20% and up to and including 70% of the covering power of the one or more non-fluorescing composite color toner images.

2. The printed receiver material of claim 1, wherein:

the fluorescent colorant is a fluorescent magenta colorant that emits at one or more peak wavelengths of at least 510 nm and up to and including 590 nm, the fluorescent colorant is a fluorescent yellow colorant that emits at one or more peak wavelengths of at least 510 nm and up to and including 570 nm, or the one or more fluorescing toner highlights comprise both a fluorescent magenta colorant and a fluorescent yellow colorant.

3. The printed receiver material of claim 1, wherein the fluorescent colorant is a yellow fluorescent colorant that is selected from the group consisting of coumarins, naphthalimides, perylenes, and anthrones.

4. The printed receiver material of claim 1, wherein the fluorescent colorant is a magenta fluorescent colorant that is selected from the group consisting of rhodamines, perylenes, naphthalimides, and anthrones.

5. The printed receiver material of claim 1, wherein the fused fluorescing dry toner particles in the one or more fluorescing toner highlights has a covering power that is at least 400 $cm^2/g$ and up to and including 600 $cm^2/g$.

6. The printed receiver material of claim 5, wherein the fused non-fluorescing color toner particles in the one or more non-fluorescing composite color toner images has a coverage power that is at least 1500 $cm^2/g$ and up to and including 2300 $cm^2/g$.

7. The printed receiver material of claim 5, wherein the fused non-fluorescing color toner particles in the one or more non-fluorescing composite color toner images has a covering power that is at least 1700 $cm^2/g$ and up to and including 2100 $cm^2/g$.

8. The printed receiver material of claim 1, wherein the one or more fluorescing toner highlights has a reflection density that is less than 1.

9. The printed receiver material of claim 1, wherein the fluorescent colorant is present in the fused fluorescing dry toner particles in an amount of at least 5 weight % and up to and including 24 weight %, based on the total fused fluorescing dry toner particle weight.

10. The printed receiver material of claim 1, wherein the receiver material is a sheet of paper or a polymeric film.

11. The printed receiver material of claim 1, wherein the one or more non-fluorescing composite color toner images and the one or more fluorescing toner highlights are provided on the receiver material by electrostatic printing or electrostatic coating.

12. The printed receiver material of claim 1, wherein the one or more non-fluorescing composite color toner images comprises two or more of a non-fluorescing cyan toner image, a non-fluorescing yellow toner image, a non-fluorescing magenta toner image, and a non-fluorescing black toner image.

* * * * *